United States Patent [19]

Hamalainen et al.

[11] Patent Number: 4,595,960

[45] Date of Patent: Jun. 17, 1986

[54] PHASE-REVERSED DITHERED AUTOMATIC SCAN TRACKING SYSTEM

[75] Inventors: Kaarlo J. Hamalainen, Marlton; George S. Zorbalas, Cherry Hill, both of N.J.

[73] Assignee: RCA Corporation, Princeton, N.J.

[21] Appl. No.: 438,793

[22] Filed: Nov. 3, 1982

[51] Int. Cl.$^4$ .............................................. G11B 5/58
[52] U.S. Cl. ..................................... 360/77; 360/10.2
[58] Field of Search ................. 360/75, 77, 70, 10.2, 360/DIG. 1

[56] References Cited

U.S. PATENT DOCUMENTS

| | | | |
|---|---|---|---|
| 4,148,082 | 4/1979 | Okada et al. | 360/77 |
| 4,151,570 | 4/1979 | Ravizza et al. | 360/77 |
| 4,197,564 | 4/1980 | Ravizza | 360/77 |
| 4,210,943 | 7/1980 | Nakamura et al. | 360/70 |
| 4,249,220 | 2/1981 | Yasutake et al. | 360/73 |
| 4,255,768 | 3/1981 | Kubota | 360/10 |
| 4,368,492 | 1/1983 | Chamberlain et al. | 360/70 |
| 4,443,823 | 4/1984 | Sakamoto | 360/77 |
| 4,470,079 | 9/1984 | Tsurata | 360/10.2 |
| 4,471,392 | 9/1984 | Zorbalas | 360/77 |

Primary Examiner—Stuart N. Hecker
Assistant Examiner—Benjamin Urcia
Attorney, Agent, or Firm—Eugene M. Whitacre; Paul J. Rasmussen; Joseph J. Laks

[57] ABSTRACT

A dither-controlled automatic scan tracking system for television signal playback includes a field-store memory for storing a scan track control signal related to the average amplitude-tune "shape" of the transducer deflection control signal. The memorized scan track signal is added to a wideband scan track feedback signal to produce a composite signal which improves tracking error. Anomalous errors can result from memorizing signals which are systematic but unrelated to transducer or head deflection from the track. The errors are reduced by reversing the dither phase each television field, thereby allowing those signals unrelated to deflection to be identified and cancelled. The dither phase reversal can be switched or a continous phase progression.

11 Claims, 48 Drawing Figures

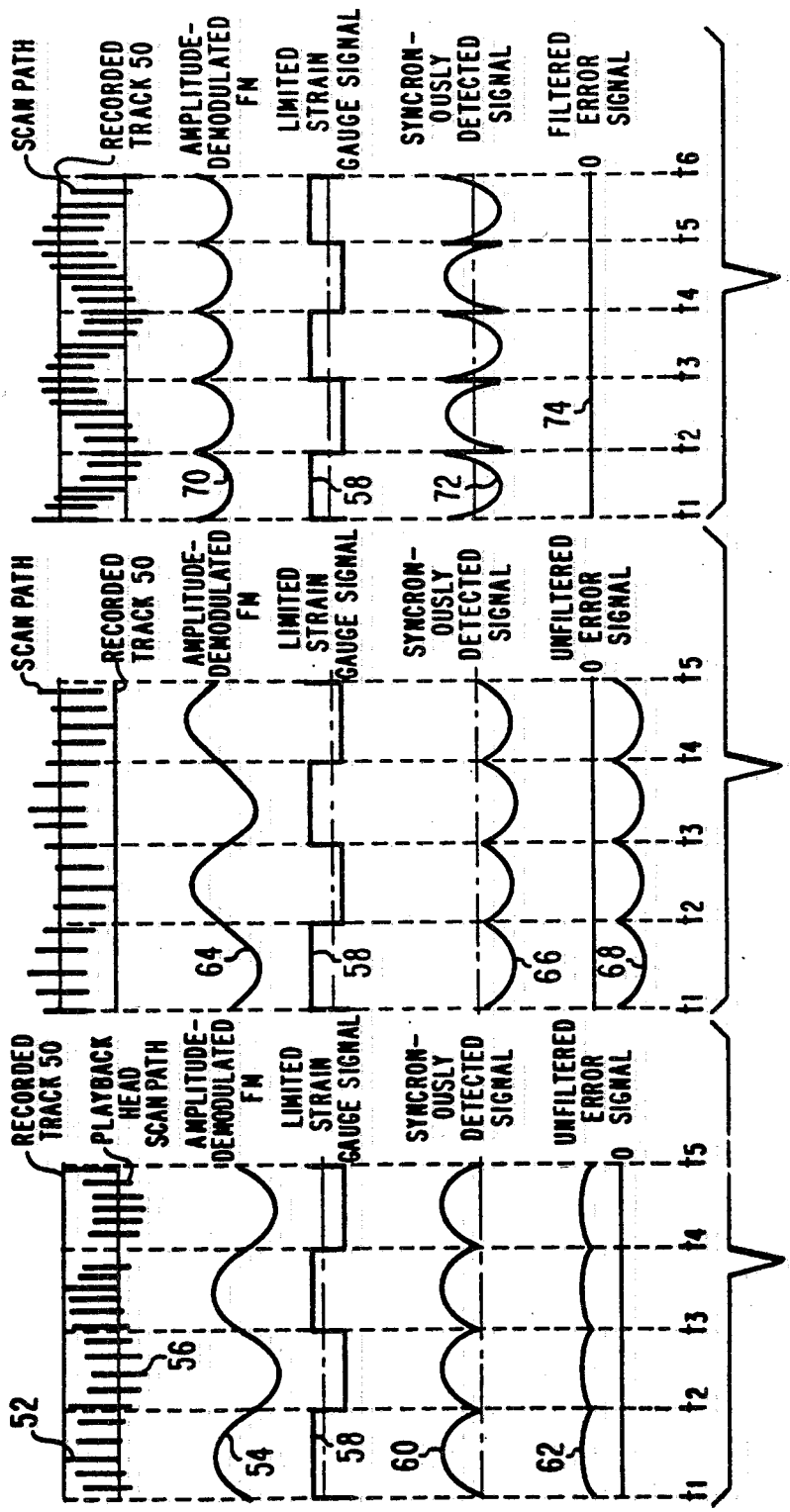

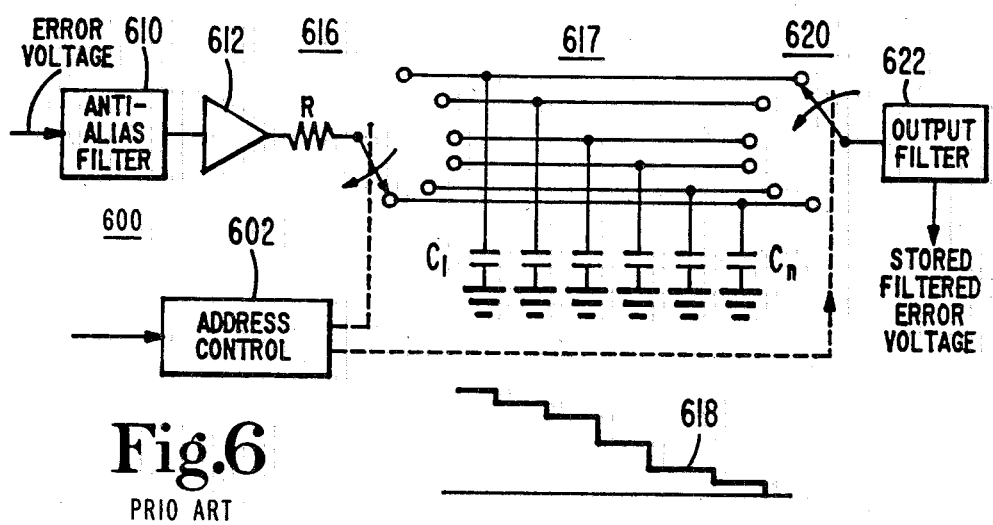
Fig.5
PRIOR ART
Fig.6
PRIOR ART
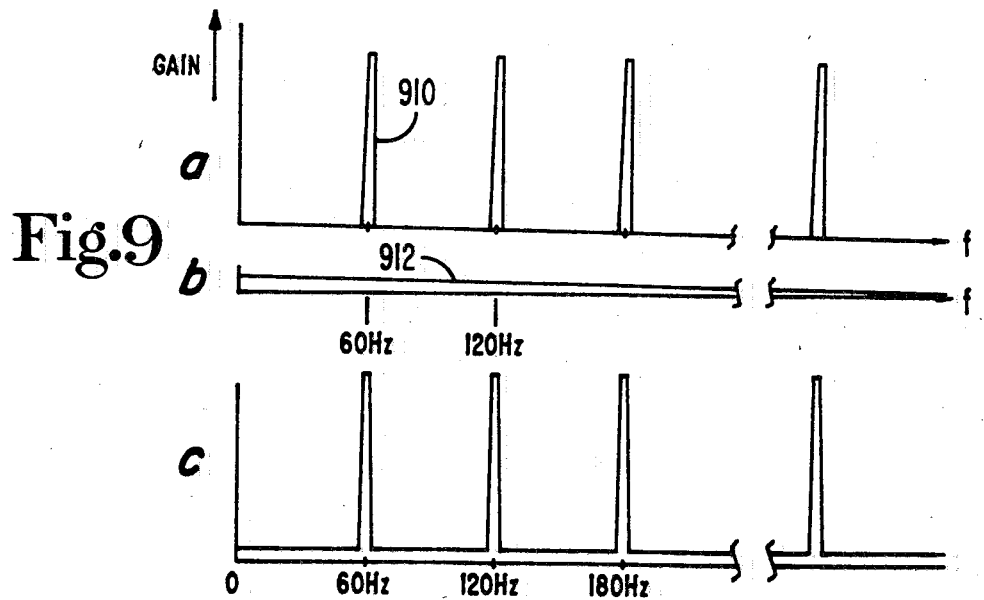
Fig.9

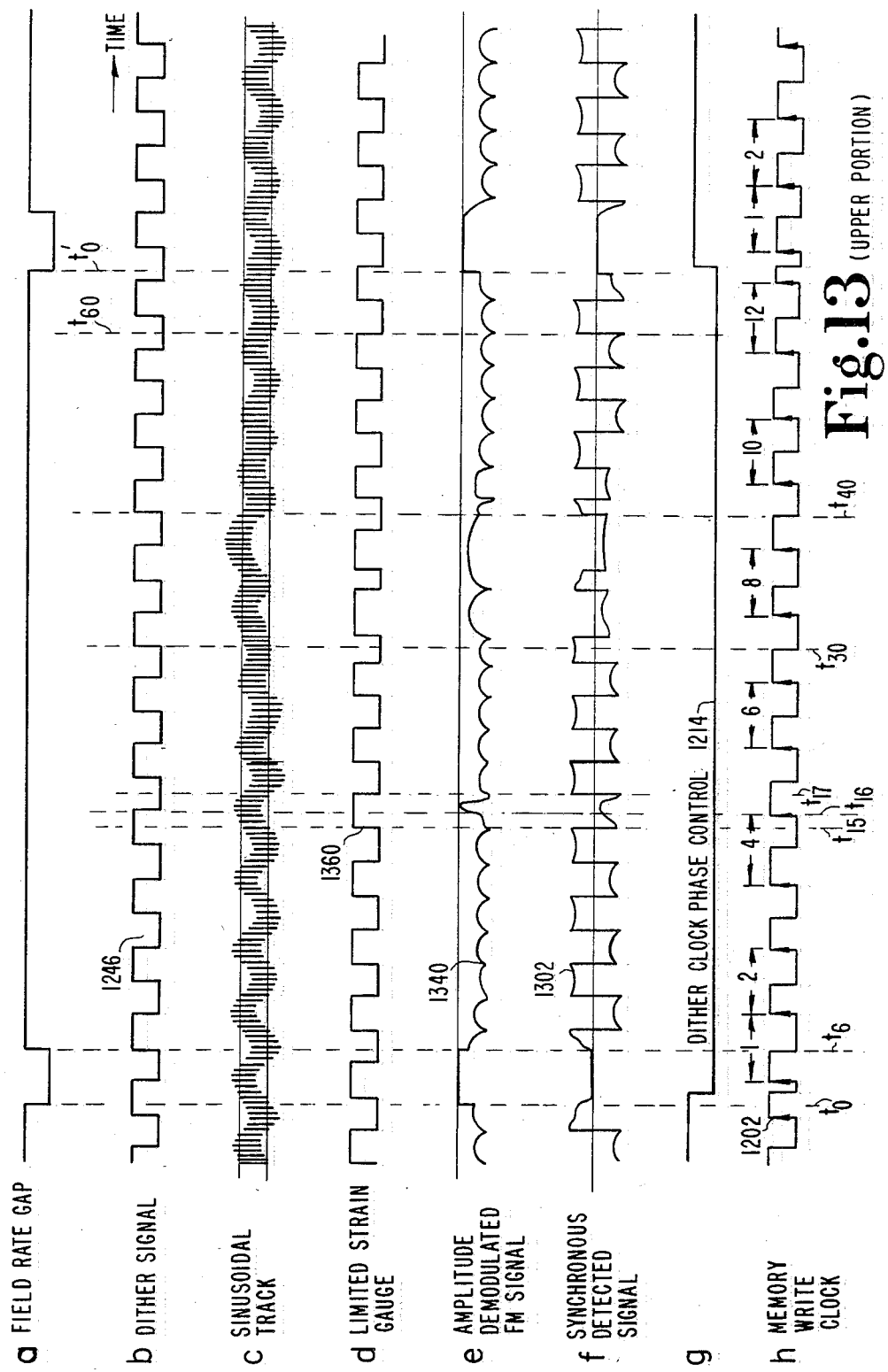
Fig. 13 (UPPER PORTION)

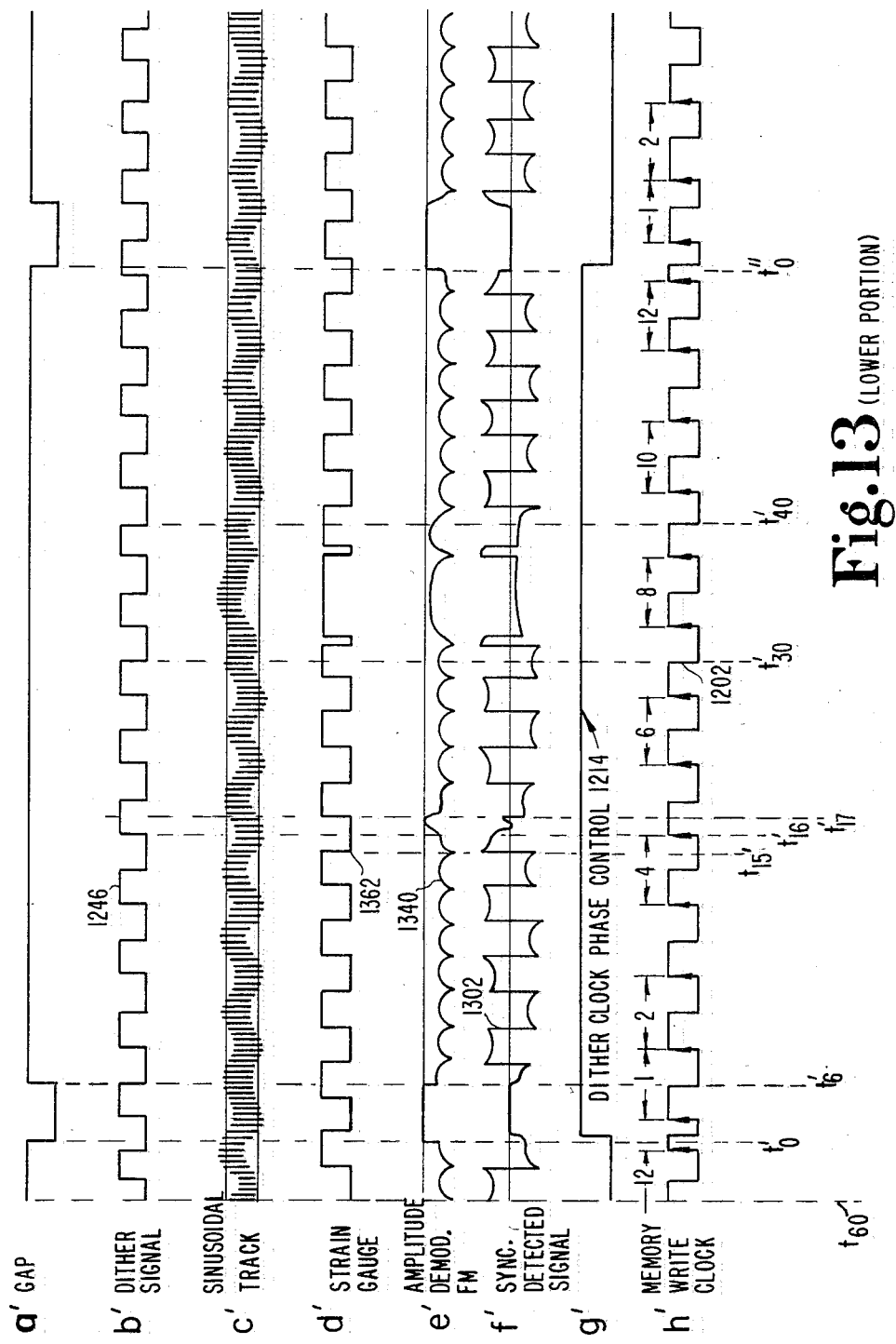

PHASE-REVERSED DITHERED AUTOMATIC SCAN TRACKING SYSTEM

BACKGROUND OF THE INVENTION

This invention relates to an automatic scan tracking system (AST) for a helical-scan VTR (video tape recorder) which reduces mistracking due to closed-loop errors by an adaptive learning of the required correction and which includes phase correction for loop delays.

Conventional helical-scan VTRs include a headwheel about which a magnetic tape passes in the helical path. Recording and playback heads associated with the headwheel are rotated at a relatively high speed so as to achieve a high transducer-to-tape velocity for good frequency response. Each scan of a head across the slowly moving tape is almost longitudinal. The recorded tape includes a succession of closely spaced recorded tracks. Ordinarily, each scan of a track by a transducer occurs in a time substantially equal to a television field (262½ horizontal lines). In order to obtain high information density on the tape, the recorded tracks are closely spaced and narrow in width. Reproduction of video signals from such a helically-scanned recorded tape requires that the playback transducer closely follow the recorded track. The width of the playback transducer cannot be made much larger than the width of the recorded track, for otherwise mistracking might result in picking up signals from an adjacent track. Due to the mechanical tolerances from tape to tape and between the various recorders and playback machines, and also due to stretching of the tape due to variations in temperature, tension and the like, mistracking of the recorded track by the playback head may occur, with the result that signals from adjacent tracks may be picked up by the playback transducer and thereby increase the noise level of the desired signal, or in extreme cases the head may completely leave the desired track and respond to an adjacent track.

In the prior-art video tape playback arrangement of FIG. 1, a tape (not shown) omega-wrapped around a headwheel (not shown) is drawn past a playback transducing head 10 attached by a mounting 12 to a piezoelectric bimorph element 14. The bimorph element is adapted for moving the playback head in a direction transverse to the direction of relative motion between the transducer and the tape, which is a direction generally perpendicular to the length of the recorded track. The head, mounting and bimorph are mounted on a headwheel (not shown) for rotation therewith so as to provide a high head-to-tape speed necessary for reproduction of video. A sinusoidal signal is applied from dither generator 48 to bimorph 14 in order to cause the playback head to move back and forth transversely as it sweeps along the recorded track, as illustrated in FIG. 2. Dither generator 48 is phase-locked to a headwheel phase position pulse (a delayed vertical pulse) from a pulse generator illustrated as a block 49. The pulse from pulse generator 49 originates with a magnetic transducer adjacent the headwheel which responds with a pulse during each head rotation. This transducer is oriented relative to the headwheel so that the transducer pulse occurs at a relatively large rotational angle (i.e. 30°) before the playback transducer crosses the gap between the tapes. Generator 49 includes a delay element, so that the headwheel phase position pulse at its output terminal occurs simultaneously with the crossing of the tape gap by the playback head.

This oscillation or dither causes the playback head to mistrack slightly to the right and to the left of the track as viewed along the track, so that the playback head partially overlies the guardbands between tracks. This has the effect of reducing the amplitude of the transduced FM carrier during those intervals in which the head partially overlies the recorded track and partially overlies the guardband. The transduced playback signal includes a carrier which is frequency-modulated with the recorded information and which is also modulated in amplitude by the effect of the dither. As transducer 10 scans a recorded track on the tape, the transduced frequency-modulated (FM) signals are coupled to the input of an FM preamplifier 18 which amplifies the signals and applies them to a playback amplifier and equalizer illustrated as a block 20. The equalized FM signals are applied to an FM demodulator 22 for demodulation of the video signals modulated onto the FM carrier. So long as the dither amplitude is not excessive, the amplitude of the FM carrier will not decrease to an extent which introduces noise into the recorded information. The information can thus be recovered by a conventional FM demodulator including a limiting amplifier for limiting the carrier to strip the amplitude modulation therefrom, together with a conventional frequency demodulator for recovering the information signal. The demodulated video is applied to a sync separator 24 and to a utilizing apparatus (not shown). The equalized FM signal from equalizer 20 is also applied to a sensing arrangement designated generally as 26 which includes an AM envelope detector 28 which detects the variations in the amplitude of the FM signal. The demodulated envelope information is applied to a sample-and-hold circuit 30 which is keyed by a tape horizontal sync pulse extracted from the video information by separator 24. Since the sync tip, as FM modulated, always represents the same FM carrier frequency, sampling of the envelope of the FM carrier during the sync tip guarantees that the amplitude of the envelope is not affected by frequency-dependent amplitude characteristics of the transducer, preamp or equalizer. The sampled signal is applied to a band-reject filter 32 for purposes to be described. The filtered signal is applied to an input terminal of a synchronous detector 34. The strain gauge illustrated as 16 is physically coupled to the bimorph element and is arranged to produce signals representative of the deflection of the bimorph and therefore of the position of transducer 10. The other input to synchronous detector 34 is the signal from strain gauge 16, amplified and limited by an amplifier 36 and zero crossing detector 38. The synchronously detected amplitude modulation of the FM carrier appearing at the output of detector 34 is applied through a second band-reject filter 40 and an amplifier and phase compensator (APC) 42 to an integrator 44. It is found that when the playback transducing head scans a path centered upon the recorded track, with the dither excursions being approximately symmetrical, that the principal component of the detected amplitude modulation is at twice the dither oscillator frequency, whereas if the scan of the playback head is centered along a path removed from the center of the recorded track, the recovered amplitude modulation includes components at the dither oscillator frequency. The phase of the recovered amplitude modulation relative to the dither oscillator signal depends upon whether the mistracking is to the right or to the left of the recorded track, viewed in the direction of the scanning path. Integrator 44 filters the error signal before applying it to an adder 46 for combination with the dither signal of frequency $F_d$. The combined dither and integrated signal is applied through a drive amplifier 50 to bimorph element 14 for deflection thereof by the sum of the error signal and the dither signal. In FIG. 2a, a portion of recorded track 50 is illustrated, together with the sinuous path, illustrated by a number of vertical lines, representing the various positions taken by the gap of the playback head as it is dithered by the combined drive signal applied to bimorph 14. At times between T1 and T2, the bimorph is deflected to one extreme of its travel and line 52 which represents the physical position of the transducer gap at that instant completely overlies recorded track 50. Consequently, the playback transducer picks up maximum FM signal, and envelope detector 28 produces a signal such as that represented by waveform 54, having a maximum positive value in the interval T1-T2. Signal 54 has a fundamental component at dither frequency $F_d$ so is not affected by $2F_d$ reject filter 32. At a time midway between times T2 and T3, the playback head is in a position illustrated by line 56, which position is half on and half off the recorded track. The portion which is off the recorded track overlies a guardband and receives no signal. Consequently, the signal picked up by transducer 10 is at a minimum as illustrated by the minimum signal level of signal 54 in interval T2-T3. This pattern is repeated in intervals T3-T4 and T4-T5. It will be noted that as illustrated, the playback head scan path is offset to one side of recorded track 50. The limited strain gauge signal 58 is indicative of the direction of deflection of the bimorph element about its nominal position. Signal 60 represents the output signal of synchronous detector 34, which is the product of signals 54 and 58. In interval T1-T2, signal 58 is positive and signal 54 is also positive, and consequently the detected signal 60 in FIG. 2a also takes on a positive value. In interval T2-T3, however, signal 58 takes a negative excursion as does signal 54, and therefore the product is still positive. Thus, the unfiltered error signal takes on an appearance similar to voltage waveform 62 having an average positive value. This signal has a fundamental component at twice $F_d$, which is filtered by $2F_d$ filter 40. The positive value of the error signal 62 is filtered by integrator 44 and coupled to drive bimorph element 14 in a direction selected to urge the playback head scan path towards the center of recorded track 50 in a closed-loop feedback manner.

FIG. 2b illustrates recorded track 50 and a dithering playback head scan path illustrated as in FIG. 2a by vertical lines representing the instantaneous position of the playback head gap. As can be seen, mistracking in the case of FIG. 2b is to the opposite side of recorded track 50. Consequently, the interval T1-T2 in which the deflection of the bimorph drives the position of the transducing head in the direction shown relative to recorded track 50, the amplitude-demodulated FM signal 64 reaches a minimum value, rather than a maximum value as illustrated in the corresponding time interval in FIG. 2a. Signal 64 has only a dither-frequency component which is not affected by filter 32. Thus, it can be seen that the polarity of the amplitude-demodulated component of the transduced signal is opposite to that shown in FIG. 2a for mistracking of the opposite sense. The product of waveforms 58 and 64 is principally negative-going error voltage of twice the dither frequency as illustrated by waveform 66 of FIG. 2b, and the unfiltered error signal, before being filtered by filter 40 and applied to integrator 44, takes on a negative value as illustrated by waveform 68. Thus, mistracking as illustrated in FIG. 2b results in an error signal of opposite polarity to that shown in FIG. 2a, and consequently the feedback loop urges the scan path towards the center of recorded track 50. FIG. 2c illustrates the situation which prevails when the scan path of the playback head is centered on recorded track 50. An amplitude-demodulated signal illustrated as signal waveform 70 is a double-rate signal by comparison with demodulated signals 64 or 54. The feedback loop may discriminate against these components, since they do not convey useful information as to mistracking. For this reason, the arrangement of FIG. 1 includes twice-dither frequency reject filters 32 and 40. The product of demodulated signal 70 and strain gauge signal 58 is illustrated as a waveform 72, which has a net value of zero, as suggested by line 74, representing a zero filtered output signal. With the head centered on the track, therefore, no error signal is generated and bimorph 14 remains in a relatively undeflected state.

If the playback machine is intended to play back tape moving only at the speed at which it was recorded, only a closed-loop dither automatic scan tracking (AST) system is necessary. Broadcast-quality tape recorder-playback machines are now provided with certain special effects capability, such as stop-motion and fast-forward playing speeds. The track as recorded on the tape is the product of two velocities; the velocity of the tape and the velocity of the headwheel. The normal tape velocity is approximately one percent of the total head-to-head tape speed, and during the recording the tape motion during one recording transducer scan is an amount equal to one track width plus one guardband width.

FIG. 3a illustrates in developed view a portion of a tape 10 upon which are recorded tracks 314, 318, 322 and 327 separated by guardbands 316, 320, and 324. The path scanned by the recording head in the absence of tape motion is illustrated as dotted lines 305. The recording head started at the top of the tape by scanning a path 305, and the tape motion in the direction shown caused the scanning of recorded track 316. Thus, the tape motion during one scan at normal tape speed is one track width plus one guardband width. If head scanning path 305 represents the scanning path of a playback head while the tape is in motion at the normal speed, it can be seen that path 305 would overlie track 316, and in principle no correction would be required. As mentioned, it may nevertheless be desirable to use a closed-loop AST arrangement to make sure that the scanning path coincides with the recorded track. For stop-motion special-effects, the playback head must scan the same track repeatedly, and so the tape must be motionless. The playback head begins scanning of a track, but because of the absence of tape motion it would end its scan on an adjacent recorded track, but for the action of the automatic scan tracking system. In the absence of tape motion, the scanning path illustrated as 326 in FIG. 3b begins at the top of the tape on track 318 but in the absence of tape motion ends its scan substantially overlying recorded track 314. In the region designated as 328, the playback head would substantially overlie the guardband 316 and equal portions of track 314 and 318, and noise would result. Under this condition, the closed-loop AST circuit can correct; but the correction required increases progressively during the scan from top to bottom; i.e. no correction is required at the top and therefore the loop error voltage is approximately zero whereas at the bottom of the scan an error voltage corresponding to a deflection of the bimorph of one track width plus one guardband width is required. Thus, the loop must correct for varying amounts of error during each scan of the playback heads across the tape. As is known, closed-loop feedback systems have a finite gain, and the finite gain requires that there be an error in order to produce the desired correction signal. Closed-loop AST systems have a wide bandwidth for fast response, but therefore have relatively limited gain which permits a tracking error when correcting for large deflections. A similar effect occurs at twice tape speed. When fast-forward playback is desired at speeds greater than twice normal, the AST is required to hold the playback head on the recorded track notwithstanding that in the absence of the AST system several recorded tracks would have passed under the playback head. It can readily be seen, therefore, that in extreme fast-forward playback modes, the deflection of the bimorph which supports the playback head may correspond to the distance between several tracks. Such special-effects modes of operation may create problems. For example, the large deflection in fast-forward modes may cause errors in tracking due to the limited loop gain and speed of the AST arrangement. Furthermore, at the end of a scan in which the bimorph is deflected by several track spacings, the head may start a new track with the bimorph already partially deflected, which may result in exceeding the physical deflection limits of the bimorph element.

Another problem related to AST tracking lies in the nonlinearity of the scan path. FIG. 3C illustrates in exaggerated form possible recorded tracks on a tape 354 which may have been recorded by a machine other than the playback machine. The recorded scan path in actuality is not linear, but contains aberrations due to the mechanical characteristics of the recorder. The greater portion of the aberrations or deviations from linearity are systematic in nature, i.e. they are repetitive from scan to scan. As can be seen in FIG. 3c, tracks 350 and 352 are not identical, but have a similar overall curvature. The playback head path also has aberrations, large parts of which are systematic. While the systematic errors of the recorded tracks may match those of the playback scan, especially if playback of the tape is on the same machine as that on which it was recorded, the systematic component of the playback deviations from linearity may be opposite, creating a situation in which the mistracking can be severe.

A known arrangement for ameliorating the effects of special-effect modes of operation on the automatic scan tracking system involves the use of a tape speed detector for generating an analog signal representative of the tape speed and applying it together with the error signal output of the synchronous detector to the integrator of the AST loop. This results in the generation of a ramp signal at the output of the integrator which is summed with the dither signal for application to the bimorph. The ramp is part of an open-loop compensation which reduces the loop gain requirements on the closed-loop AST system because the bimorph is always positioned in approximately the correct place by the ramp.

FIG. 4 illustrates such a prior art arrangement for injecting an open-loop ramp compensation so as to reduce the mistracking for large deflections in cases where the tape playback speed is other than the recording speed. Those portions of FIG. 4 corresponding to elements of FIG. 1 are given the same reference numbers. Additional elements in FIG. 4 include a summing circuit 410 coupled between phase compensator 42 and integrator 44, a tape speed detector 412, an output of which is coupled to an input of summing circuit 410, and a ramp reset system 414 also having an output terminal coupled to an input terminal of summer 410. A crystal oscillator 416 provides a time reference for tape speed detector 412 and ramp reset 414.

Tape speed detector 412 receives tape horizontal sync pulses separated from the demodulated video by sync separator 24. A phase-locked oscillator 420 produces 2H pulses which periodically reset counter 422. Counter 422 is coupled to receive clock pulses from crystal oscillator 416. Tape speed is determined by counting the time between horizontal sync pulses derived from the tape. As mentioned, normal tape speed corresponds to about one percent of the head-to-tape velocity. A slowing down or stopping of the tape, therefore, can make as much as a one percent difference in the rate at which sync pulses are transduced from the tape. Tape speeds in excess of the normal tape speeds likewise affect the rate of the transduced tape sync pulses. The decoded output of counter 422 is therefore representative of tape speed. The decoded output is applied to a digital-to-analog converter 424 for conversion to an analog signal which is filtered by an integrator 426 to form a substantially constant voltage representative of the instantaneous tape speed. An equally acceptable tape-speed signal generator is an integrator coupled to the capstan tachometer, which also produces an analog signal indicative of tape speed. The analog speed voltage, however generated, is applied to an input of summing circuit 410 to be summed with the unfiltered loop error voltage from synchronous detector 34. The tape speed may be expected to remain constant over times as short as one scan of the tape by the head, and therefore the analog tape-speed voltage component of the signal applied to integrator 44 generates a ramp illustrated as 428. Ramp 428 is applied to summing circuit 46 and the dither is added thereto to form a dithered ramp signal illustrated as 430 which is applied to the bimorph element. The ramp component of the bimorph drive signal is an open-loop compensating voltage tending to cause the bimorph to deflect over the interval of one head scan of the tape by an amount corresponding to the expected average deviation as determined by the tape speed. The open-loop compensating ramp voltage applied to bimorph 14 causes it to deflect in a ramp-like manner and strain gauge 16 therefore produces as an output signal a dither signal superimposed upon a ramp, as illustrated by 432. Such a superposed ramp might affect operation of zero-crossing detector 38. This effect is avoided by deriving a ramp sample 428 from the output of integrator 44 and applying it to an inverting input terminal of amplifier 36 to offset the ramp component of the input signal applied from the strain gauge to the noninverting input. Thus, only the dither signal appears at the input of zero-crossing detector 38, as before, and the open-loop ramp correction does not affect zero-crossing detector 38.

As mentioned, the tape speed remains approximately constant over the duration of one scan and in fact over the duration of several scans of the tape. Consequently, the analog tape speed signal applied from tape speed detector 412 to summing circuit 410, if continued, would cause the output signal of integrator 44 to grow without limit. The tape speed ramp-correction, therefore, creates a condition in which there must be a reset of the ramp signal at the output of the integrator after the completion of each scan by the playback head, for the increasing ramp would cause a corresponding increase in the bimorph deflection. The reset is provided by a controllable reset current generator, the output of which is summed with the analog speed signal at the input to the integrator of the AST loop. Ramp reset circuit 414 includes a controllable signal source 434, the output of which is coupled to a further input of summing circuit 410. The reset current generator 414 is controlled to reset the integrator by an amount established by a jump decision logic circuit which in turn is controlled by the headwheel drum once-around signal, reference 2H signals and the clock signal from oscillator 416 to determine the phase of the vertical sync pulse from the tape by comparing its actual time of arrival with the time at which it would be expected to appear if the tape were moving at its normal speed. A logic circuit 436 chooses a preset magnitude of the reset ramp which is required to place the bimorph and its associated playback head on the desired track at the beginning of the next following scan. Signal generator 434 is enabled by the logic circuit and produces a signal the magnitude of which is established by the logic circuit. This large signal is applied to summer 410 for a short period of time, which resets integrator 44 as illustrated by portion 438 of ramp 428. The open-loop correction ramp therefore provides an open-loop correction which positions the bimorph and its associated playback head in the approximate location which is required to follow an ideal recorded track for the particular tape speed at which playback occurs. The reset current generator moves the bimorph to position the transducer at the appropriate track at the beginning of the next scan.

The open-loop ramp correction only approximates the correction actually required. Furthermore, as mentioned, the required correction deviates from a linear ramp along the scanning path of the transducer, from position to position along the tape and as a function of the particular tape and playback machine being used. Residual mistracking may therefore occur. The residual mistracking prevents reduction of the width of the guardband, and so causes tape consumption to exceed the minimum possible. The residual mistracking may become large enough to cause the introduction of noise. To correct this resident mistracking memory system is used to memorize the exact shape of the required bimorph drive voltage from one field scan to the next, as described below FIG. 5 illustrates as a waveform 502 a representative drive voltage required to maintain a playback transducer on a recorded track. Waveform 502 is curved in the interval T502-T503, the active portion of the scan, while it is flat in interval T500-T502, the time during which the transducer head is crossing the tape gap. The magnitude of the error voltage required to start the head on the track is different from the magnitude of the error voltage required at the end of the previous track, such as at time T503. Thus, mistracking can occur at the beginning of the track before the wideband loop can acquire the track and slew to the correct position. The memorized or stored error signal as a function of position along the track is used to supplement the error signal in a phase which allows the servo loop to have high gain at multiples of the headwheel once-around frequency, for improved reduction of systematic errors occupying a very narrow bandwidth near zero frequency and around multiples of the headwheel rotational frequency.

FIG. 6 illustrates the general configuration of an analog memory 600 suitable for storing an error voltage. The error voltage detected by synchronous detector 34 is anti-alias-filtered and the filtered error voltage is applied to a resistor R which is switched by a multiplexing switch 616 in turn to a plurality of capacitors C1–Cn designated together as 617. If a complex output filter 622 is used, input anti-alias filter 610 may be dispensed with; i.e., the input anti-alias filter may be merged into output filter. Multiplex switch 616 is controlled by a switch drive to cycle at the same rate as the scan recurrence rate of the playback head, which is normally the rotational speed of the headwheel. For each position taken by multiplex switch 616, one of capacitors C is coupled through resistor R to the output of synchronous detector 34, and this occurs at approximately the same point in each recurrent scan. After a period of time of operation corresponding to several headwheel rotations, each of the capacitors charges to a voltage representative of the average value of the error voltage required at the particular position along the playback head scan at which the capacitor is in-circuit. If the voltages on capacitors C of FIG. 6 could be made visible after a period of operation with an error signal such as is shown in FIG. 5, they might have the appearance of stepped waveform 618. Output multiplex switch 620 is operated in synchronism with switch 616 but at a different phase for selecting the appropriate stored error voltage for the particular position of the playback head along its scan and for applying the voltage to an output filter 622 having a characteristic shown in FIG. 7 which is low-pass with a null at 360 Hz, half the sample rate of switches 616 and 620. The filtered stored error voltage is applied from output filter 622 as a further input signal to adder 410 of the tracking arrangement o0f FIG. 8a. The spectral response of filter 600 of FIG. 6 is illustrated as 910 in FIG. 9a. The spectral response 910 includes narrow peaks centered at multiles of the headwheel rotational or scanning rate of 60 HZ for NTSC VTR, and the bandwidth of each of the response peaks is related to the values of R and C. Because of the narrow bandwidth of the closed-circuit feedback loop including filler 600, the gain about the path may be made greater than the gain of the wideband path. FIG. 9b illustrates as 912 the spectral response of the closed-loop portions of the wideband portion of the AST system, and FIG. 9c illustrates as 914 the result of combining the wideband low-gain and comb-like high-gain responses. The gain of the feedback loop is made very high near those frequencies which are related to the rotational velocity of the headwheel and multiples thereof.

As illustrated in FIG. 8a, the memorized or stored signal is inserted at summing point 410. Consequently, the correction signal is integrated by integrator 44 before being applied to bimorph 14. The memorized error signal can therefore be viewed as being the first derivative of the position, i.e. the error signal represents the rate-of-change of position, which is velocity.

There are delays in the feedback loop. Filters, especially, contribute to the delays. Thus, the errors written into memory 600 are delayed relative to the time at which they are produced by the wideband correction loop. For this reason, the reading of memory 600 does not occur exactly one scan duration (1/60 second for NTSC standards) after the information is written into the memory, but instead is read at a time somewhat advanced from 1 scan duration later. This causes the stored correction to be summed with the wideband correction with the proper phase. Naturally, the exact amount of advance will depend on the nature of the loop. FIG. 8b illustrates a detailed embodiment of memory 600 of FIG. 8a. Switching of multiplex switches 616 and 620 in FIG. 8b is controlled by an address control generator 602. Address control generator 602 is synchronized with dither-frequency signals from generator 48 applied over a conductor 820 and is reset by delayed vertical-rate pulses derived from the output of pulse generator 49 and applied to memory 600 over a conductor 822. Exactly 12 720-Hz dither-frequency pulses occur during one revolution of the headwheel at 60 Hz.

FIGS. 8c illustrate with timing diagrams the nature of the addressing scheme for error memory 600. In FIG. 8b, input terminal 820 receives analog error signal from anti-alias filter 610 and applies it through a resistor R to multiplex switch 616 having terminals numbered 1-n where n can be a number such as 11, equal to the number of capacitors, capacitor 1 through capacitor 11, in capacitor bank 617, not individually illustrated in the figure. Similarly, multiplex switch 620 has a number of contacts also equal to the number of capacitors which in the example is 11. Multiplex switch 620 selects a capacitor and couples the stored error signal of that capacitor to anti-alias filter 622 and to the remainder of the AST servo loop. The 11 positions of multiplex switch 616 can be addressed by 11 of the 16 possible hexadecimal code combinations available on 4-bit line 830, and the 11 switch positions of multiplex switch 620 can likewise be selected by 11 of the 16 codes possible with 4-bit line 832. Each of lines 830 and 832 is half of the 8-bit output of a latch 822 which is addressed by the 720-Hz dither-frequency clock on a line 834 derived from dither generator 48 by a limiting amplifier 860. Clock signal 48 is phase-locked to 12 times the vertical synchronization frequency. The dither clock is illustrated as 842 in FIG. 8e. Latch 822 merely acts as a power driver for the output of erasable PROM (EPROM) 824, the output terminals of which do not have large drive capacity. The 8-bit output of EPROM 824 is also applied to the input terminals of a tristate latch 826 which is also clocked by dither clock 842. Eight pull-up resistors illustrated together as a resistor 827 are coupled to the eight output conductors of EPROM 24. Generator 49 is coupled to a reset (R) input terminal of latch 26 over a conductor 822. This delayed pulse occurs as the playback head crosses the tape gap. The time location of the gap crossed by the playback head is illustrated by the LOW position of waveform 862 of FIG. 8c. The 8-bit output of latch 826 is coupled to the address (A) input of EPROM 824.

In operation, the delayed vertical pulses 840 as illustrated in FIG. 8d are applied over conductor 822 to the R input of latch 826. Tristate latch 826 assumes a high impedance condition on its output conductors when R is high. Pull-up resistors designated 827 raise the eight conductor to a logical HIGH.

The 8-bit logical HIGH is applied to the address (A) input terminals of EPROM 824 at a time $T_O$ and causes the appearance at its output terminal of 8-bit preprogrammed values for that address. The preprogrammed values are applied to those input terminals of lathes 822 and 826. At the first positive-going transition of dither-frequenoy clock signal 842 at a time $T_1$ slightly later than time $T_0$, latch 822 transfers its input signal to its output terminals and holds them. Latch 826 also latches the signal at its input terminal but still has its output terminals disabled by the logical HIGH at its R input terminal so its output signal is HIGH by pull-up resistor 827. The 8-bit signals of latch 822 are applied as 4-bit hexadecimal address signals to the address input terminals of multiplex swiches 616 and 620. At time $T_2$, delayed vertical pulse 840 ends, allowing normal operation of latch 826. At time $T_2$, therefore, the signal latched at time $T_1$ by latch 826 appears at its output terminals. This in turn changes the address of EPROM 824 and causes it to produce a new preprogrammed output word. At time $T_3$, a positive transition of clock signal 842 latches the new word in both latches 822 and 826. Thus, multiplex switches 616 and 620 receive a first address word at time $T_1$, which is a positive-going transition of clock signal 842, and receives a second word different from the first at time $T_3$, which is the next clock transition. The words select the throw positions of the switches. At each successive clock transition, the latches latch the EPROM output signal, which becomes a new address word for the multiplex switches and for the EPROM. No race condition exists in the EPROM-latch loop, because latching takes place much faster than the EPROM output signal can change.

At a time $T_{20}$ the twelfth positive-going transition of clock pulse 842 occurs. This is the last transition preceding the next following delayed vertical pulse 840. At time $T_{21}$, a new reset pulse disables the output terminals of latch 826, causing the address applied to EPROM 824 to be the same as it was at time $T_0$, and the cycle of addressing begins once again. As a result, a first set of hexadecimal numbers is applied to multiplex switch 616 in synchronism with the clock signal, and simultaneously a second, different set of words is applied to multiplex switch 620. Thus, the order of writing and reading is independently established for switches 616 and 620 by preestablished information in the addresses of EPROM 824.

Voltage waveform 844 of FIG. 8f represents an analog error signal which represents one possible systematic error signal which might appear at conductor f at the input terminal of filter 610 from synchronous detector 34. Error voltage 844 has a value of zero during the gap interval (approximately $T_1$ to $T_3$) because of the action of a clamp (not shown). The delayed output signal 846 from filter 610 is illustrated in FIG. 8g. It will be noted that the waveform is similar to that of waveform 844, because filter 610 has a wide bandwidth compared with the error component frequencies. Signal 846 at the output of filter 610 must be written into memory at the time at which it appears. It must be remembered that the term "writing into memory" in this context means averaging the value of the currently available signal with previously written values, because the presence of resistor R prevents instantaneous charging of the capacitors. Voltage waveform 846 is applied through resistor R and switch 616 to a first capacitor illustratively capacitor 1 of capacitor bank 617, in the interval $T_8$–$T_{10}$ of FIG. 8h and the average value of voltage 846 over that interval is averaged with the voltage already stored on the capacitor. At time $t_{10}$, the voltage 846 is applied through resistor R to capacitor 2 for averaging over the interval $t_{10}$–$T_{12}$. In a like manner, the instantaneous voltage of signal 846 is applied in succession to capacitors 3 to 11 for storing on each capacitor a signal related to the error signal. Since averaging is being done recurrently each 1/60 second, systematic signals will generate a finite average voltage and nonsystematic noise will tend to cancel. In this way, the values of the error signal required to overcome systematic mistracking is gradually built up in the capacitor bank. At time $T_{26}$, the playback head begins to cross the gap between scans and the aforementioned clamp reduces the error voltage to zero. Since this information is not useful for tracking purposes, no writing needs to be accomplished at this time. That is why only 11 capacitors need to be used even though there are 12 dither clock cycles during a 1/60 second scan time. Writing is inhibited by switching switch 616 to an unused terminal (for an electronic switch, a particular logical input combination inhibits all transmission). The EPROM produces at times $T_6-T_8$ and $T_{26}-T_{30}$ output signals which are used to address such unused terminal. The output signals are latched by latches 822 and 826 in the same maner as any other switch address.

The reading of memorized averaged error signal is also controlled by the predetermined information stored in EPROM 824. For example, at time $T_0$, when latch 826 is reset to an all-ONE output state, PROM 824 at the corresponding address has stored two four-bit hexadecimal numbers, the first of which when latched at time $T_1$, by latch 822 addresses capacitor 10 for writing as illustrated in FIG. 8h, and the second of which is applied to multiplex switch 620 for reading capacitor number 2 as suggested by FIG. 8i. After several cycles of operation, the capacitors when sequentially read will produce an output voltage such as is suggested by waveform 848 of FIG. 8j. Since the capacitor voltage does not change materially during reading, waveform 848 is stepped rather than continuous. At each successive clock pulse, a new hexadecimal output signal of EPROM 824 is latched by latch 822 for application to swtich 620 for selection of a capacitor to be read. At time $T_{18}$, the portion of the output signal is reached corresponding in time to the error voltage during the gap. In order to assist the wideband feedback loop, EPROM 824 produces a hexadecimal address for swich 620 which selects capacitor 1 for reading between times $T_{18}-T_{20}$ of FIG. 8i. Capacitor 1 is the capacitor which was written into between time $T_8-T_{10}$ of FIG. 8h, immediately following the gap. At the next clock pulse at time $T_{20}$ of FIG. 8i, the preprogrammed value stored in EPROM 824 again selects capacitor 1. Thus, the error voltage requird at the beginning of a track is applied to the bimorph while the playback head is still in the gap between scans. This aids in rapid acquisition of tracking.

It will be noted that stepped waveform 848 is not in-phase with original wideband error voltage 844. Waveform 850 of FIG. 8k illustrates the voltage output signal of multiplex switch 620 as modified by the delay and filtering effect of filter 622. The steps are reduced in amplitude, and the delay of about two clock pulses makes memorized waveform 850 substantially congruent in time with waveform 844. Thus, the memorized signal is applied in the correct phase for aiding the wideband loop, and also aids further by anticipating the value of error signal required at the beginning of a track for best timing.

As mentioned, the memory stores and builds up a voltage representative of systematic errors, while filtering out nonsystematic or anomalous errors. There are certain conditions in which the described memory system may cause mistracking. Such conditions may arise if there is a systematic increase or reduction in the amplitude demodulated FM carrier in synchronism with the once-around of the headwheel. A reduction of the FM carrier amplitude transduced upon playback may recur an the same scan position if the tape has a longitudinal scratch, which will cross all of the scan tracks at approximately the same position. Also, at the beginning of each scan track, the head-to-tape engagement may be imperfect, resulting in systematically reduced FM amplitude. The dither clock is locked to the headwheel rotation, so a systematic reduction in amplitude will always be detected by the same clock phase, and will produce an error signal. The error signal will tend to drive the head off-track, even if correctly positioned, exacerbating the problem of low detected FM signal amplitude. The instability due to systematic signal performance limits the loop gain of the AST system and therefore reduces the signal-to-noise due to the head deviating significantly from the track. It is desirable to reduce the effects of systematic signals unrelated to head tracking.

SUMMARY OF THE INVENTION

An automatic scan tracking arrangement for maintaining a transducer aligned with an elongated television signal information track includes a transducer adapted for being coupled to the information track for transducing television signals therefrom. The transducer sits on a controllable mount by which it can be moved transverse to the track under control of a signal applied to a control terminal of the mount. A controllable dither generator is coupled to the control terminal for causing deviations of the transducer, thereby dithering the transducer relative to the track and perturbing the transduced signal. A degenerative feedback loop is coupled to the transducer and to the control terminal of the mount to hold the transducer aligned with the track. In order to reduce effects of systematic perturbations of the transduced signal which are unrelated to tracking errors, the dither signal generator is controlled for changing the phase of the deviations of the transducer relative to the transduced television signal. In a first embodiment, the phase control is accomplished by setting the dither frequency to N times the television field rate, and switching the phase at the field rate. In a second embodiment, the phase control is accomplished by setting the dither frequency to $(N+\frac{1}{2})$ times the field rate, by which the phase of the deviations progresses by 180 degrees during each field interval.

DESCRIPTION OF THE DRAWING

FIGS. 2a, 2b, and 2c illustrate various signal voltages occurring in the arrangement of FIG. 1 under different tracking conditions;

FIG. 5 illustrates an amplitude-time plot of a particular error signal with a systematic component;

FIG. 6 illustrates in simplified form a prior art memory suitable for storing error signals;

FIGS. 9A, 9b, and 9c illustrate a spectrum plot of the relative response of the memory of FIG. 6.

FIGS. 13a–13h and 13a'–13h' show timing diagrams aiding in understanding the embodiment of FIG. 12.

DESCRIPTION OF THE INVENTION

Figure 1:
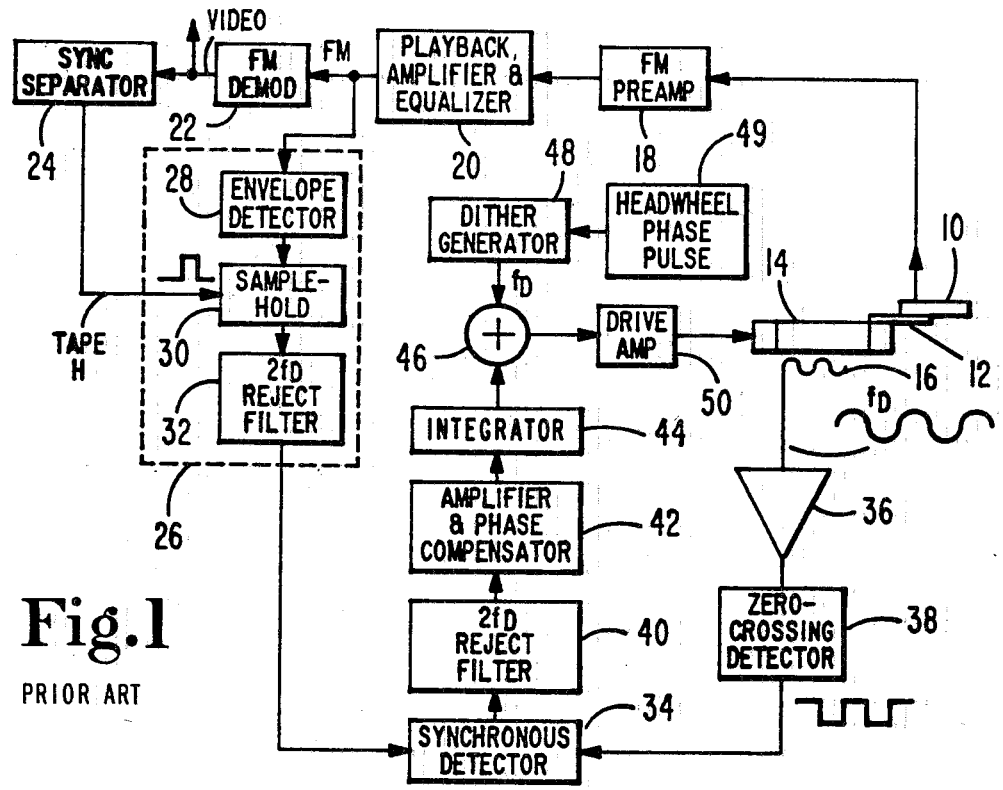
FIG. 1 is a block diagram of a portion of a video tape playback machine including a prior art automatic scan tracking arrangement.
Figure 7:
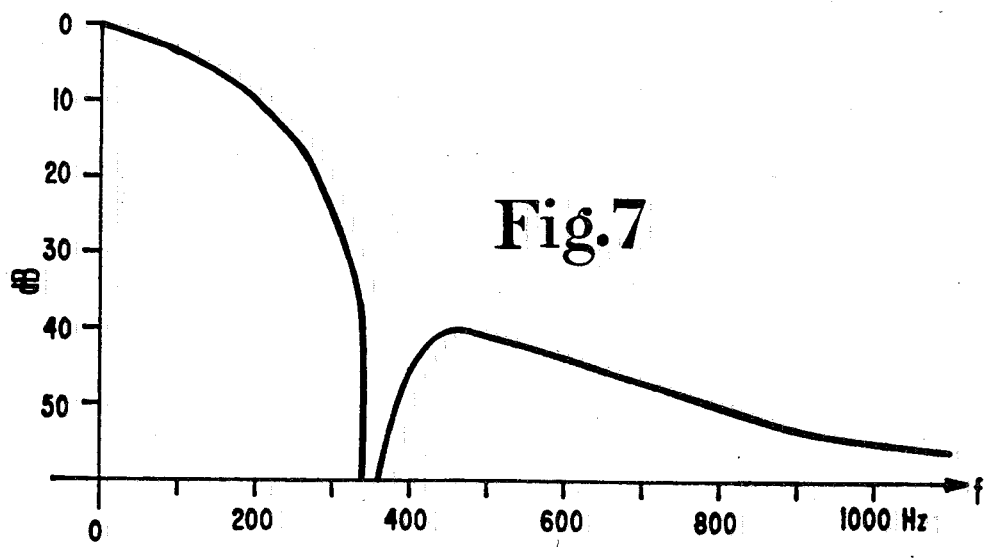
FIG. 7 is a plot of the frequency response of an anti-alias filter of the arrangement of FIG. 6.
Figure 3A:
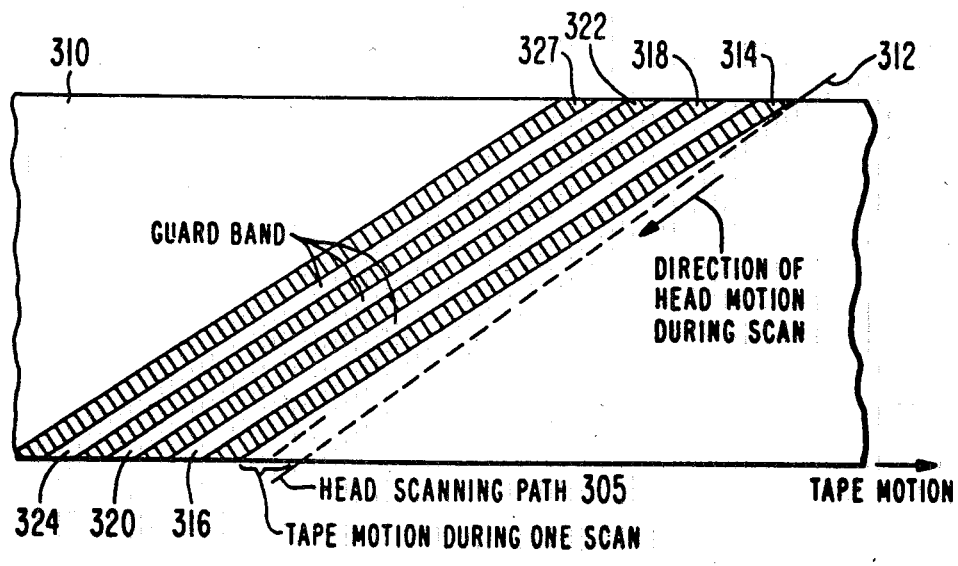
FIGS. 3a 3b, and 3c illuslrate the effect of tape motion on the position of the reccorded tracks relative to the scanning head and certain tracking errors which occur in practice.
Figure 3B:
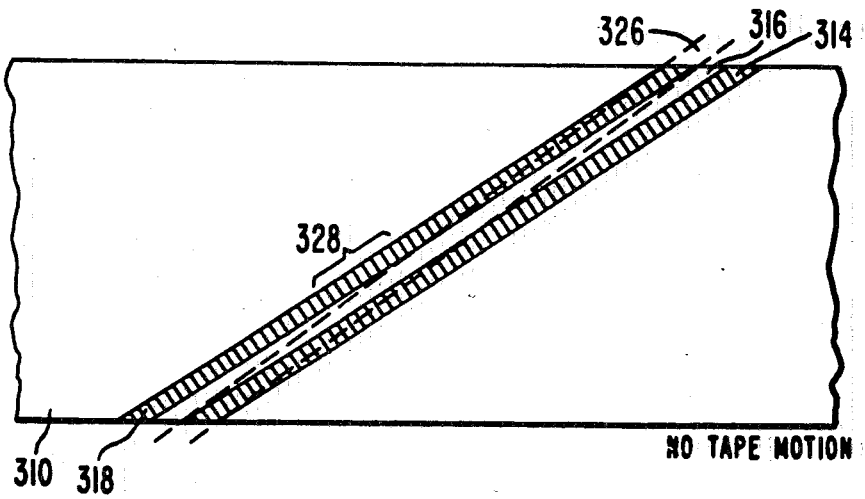
Figure 3C:
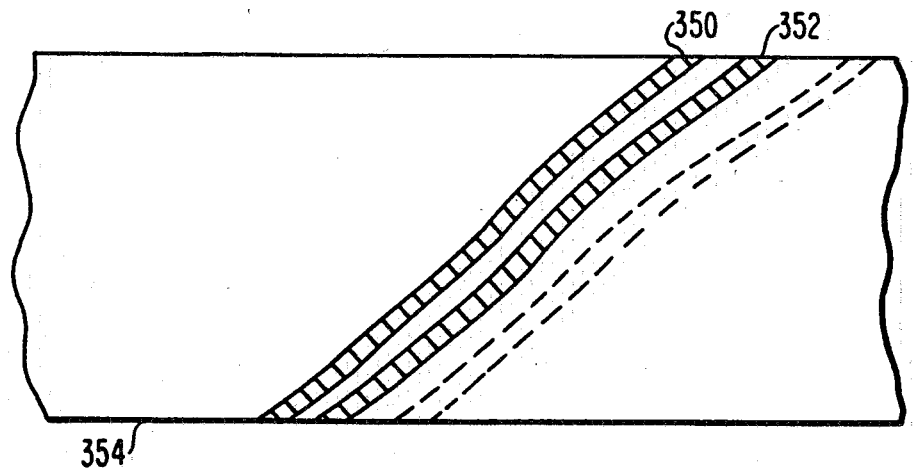
Figure 4:
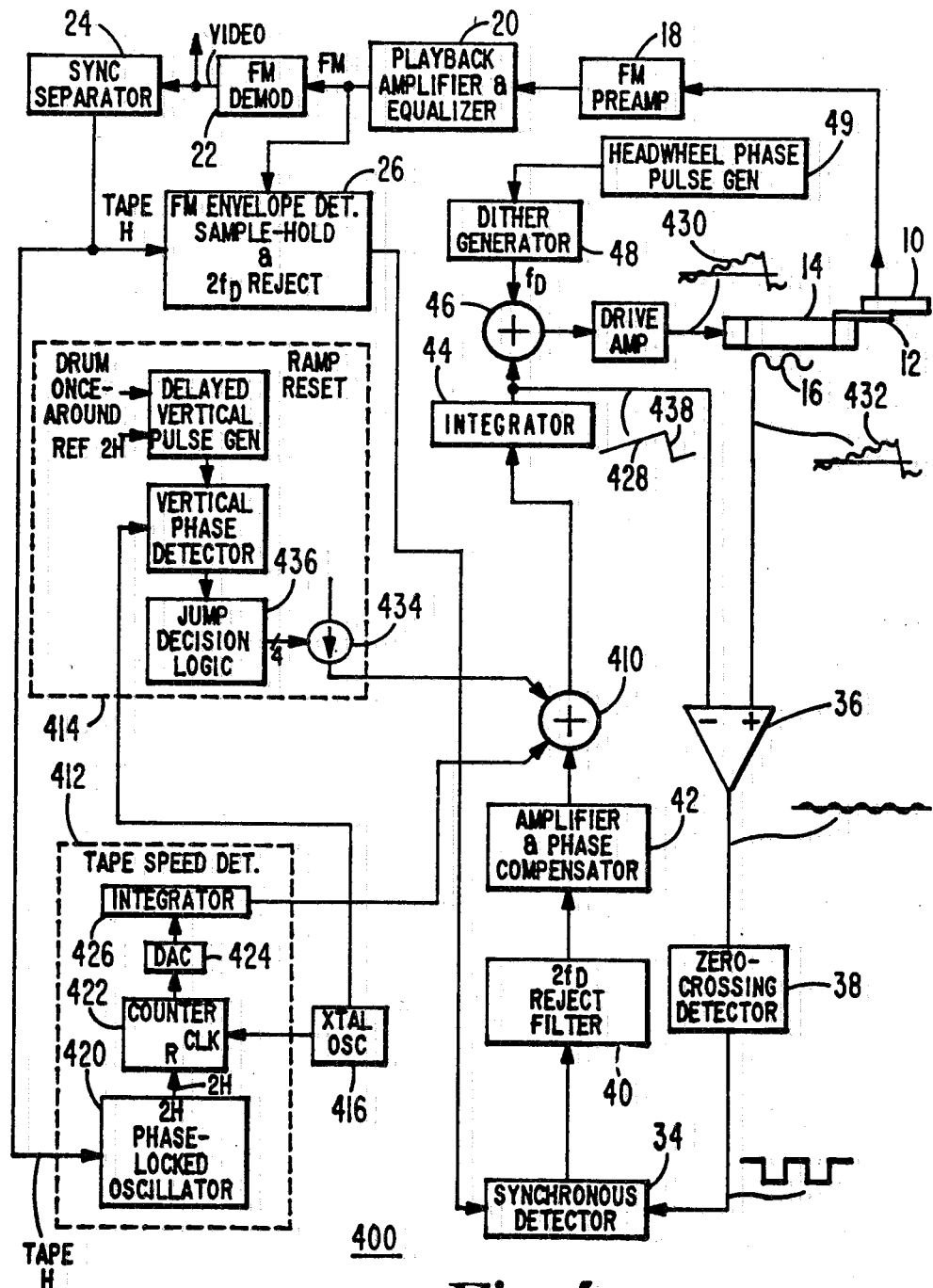
FIG. 4 is a block diagram of a prior art video tape playback arrangement adapted for playing back tapes at various tape speeds.
Figure 8:
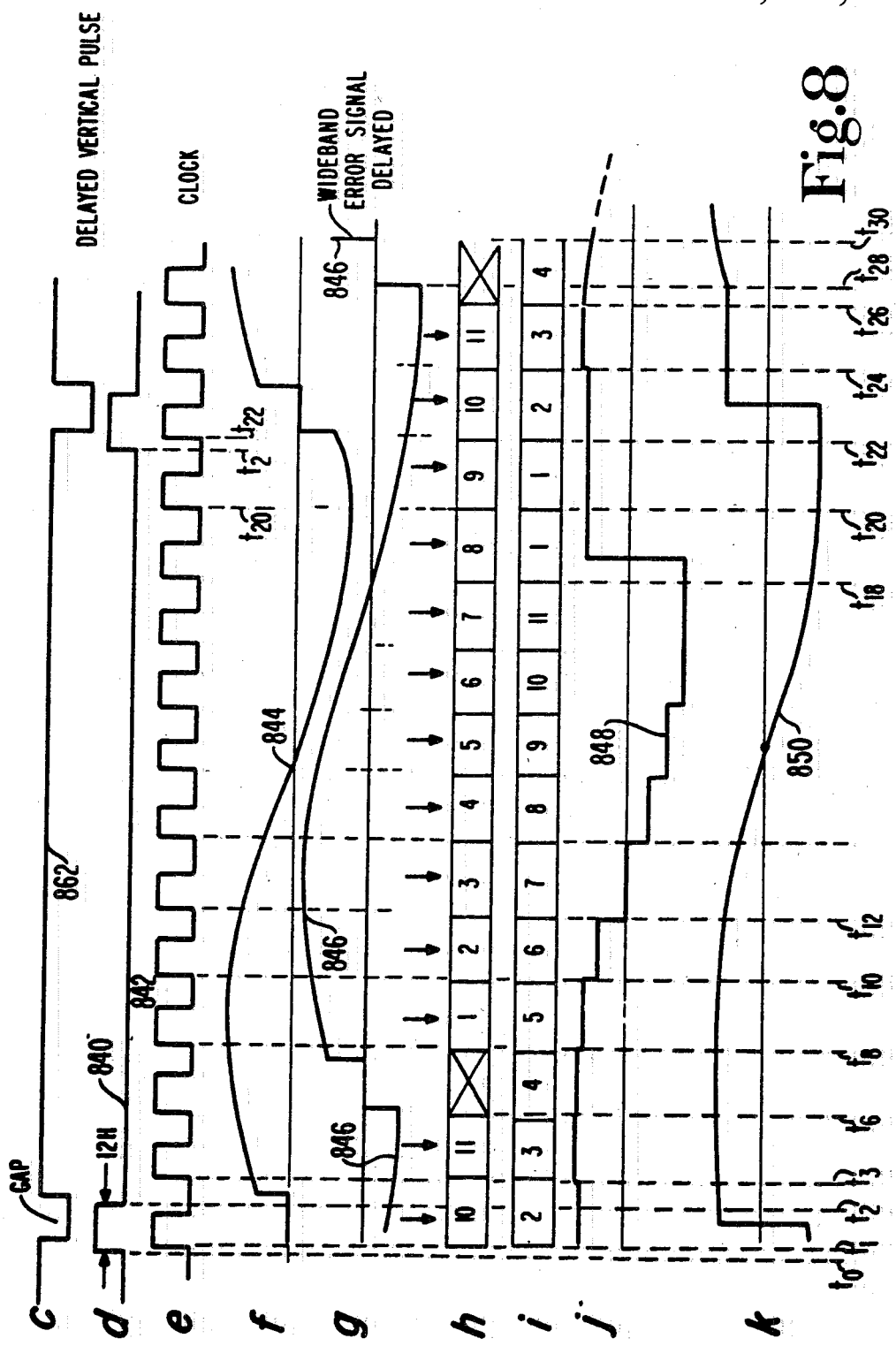
FIG. 8a is a block diagram of a prior art AST system including the memory of FIG. 6.
FIGS. 8b–k include details of the AST system memory and diagrams aiding in understanding the operation therein.
Figure 8A:
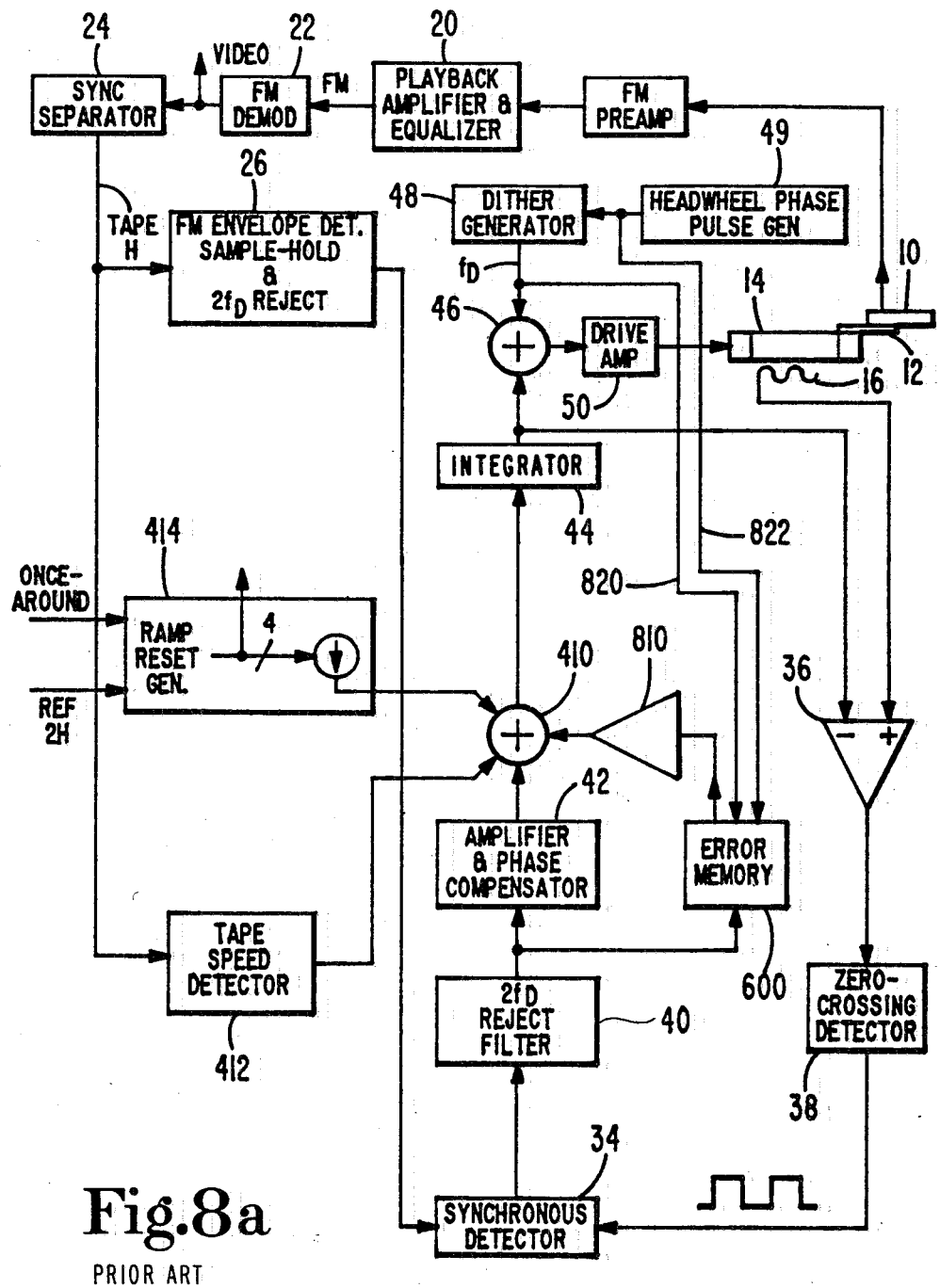
Figure 8B:
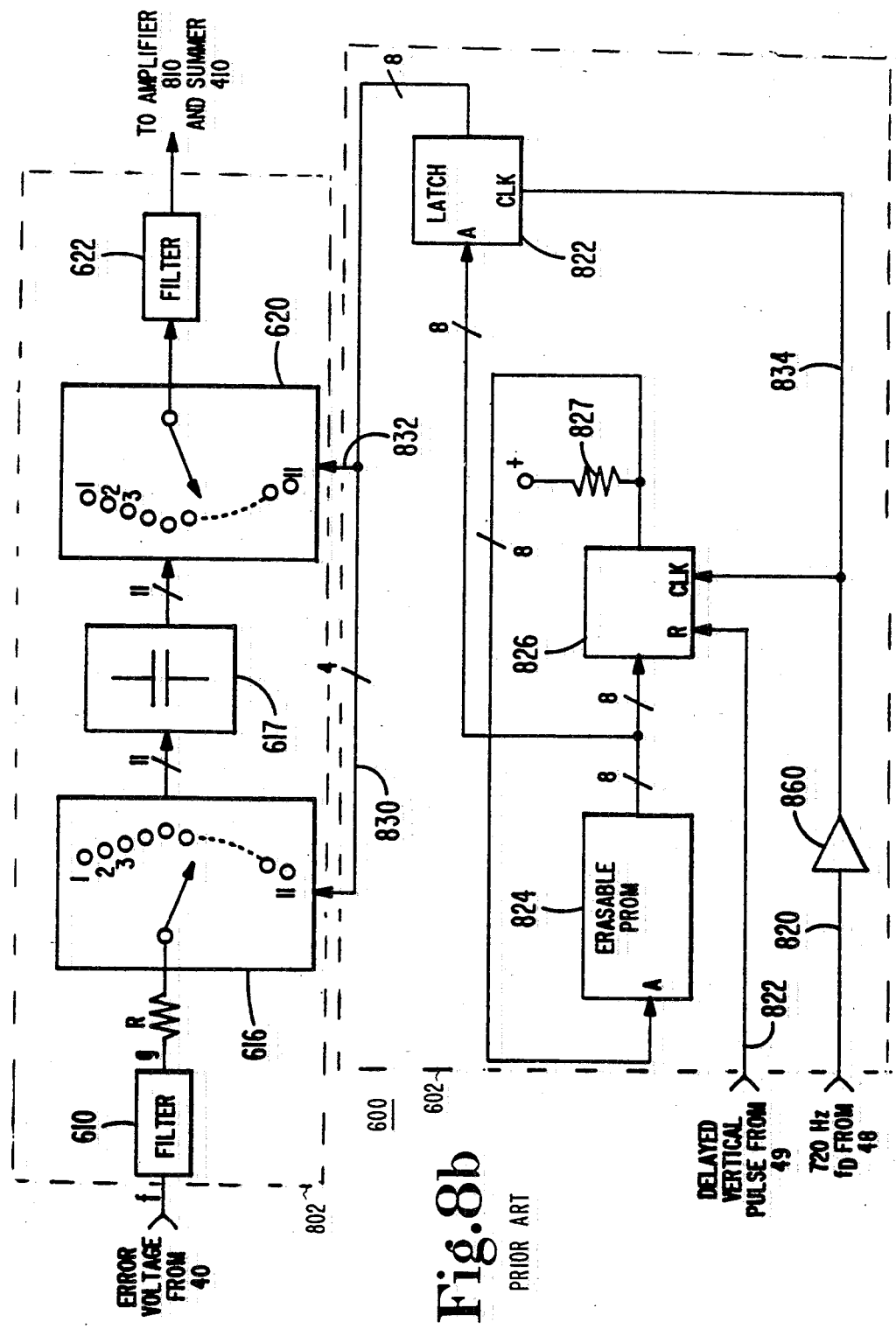
Figure 10:
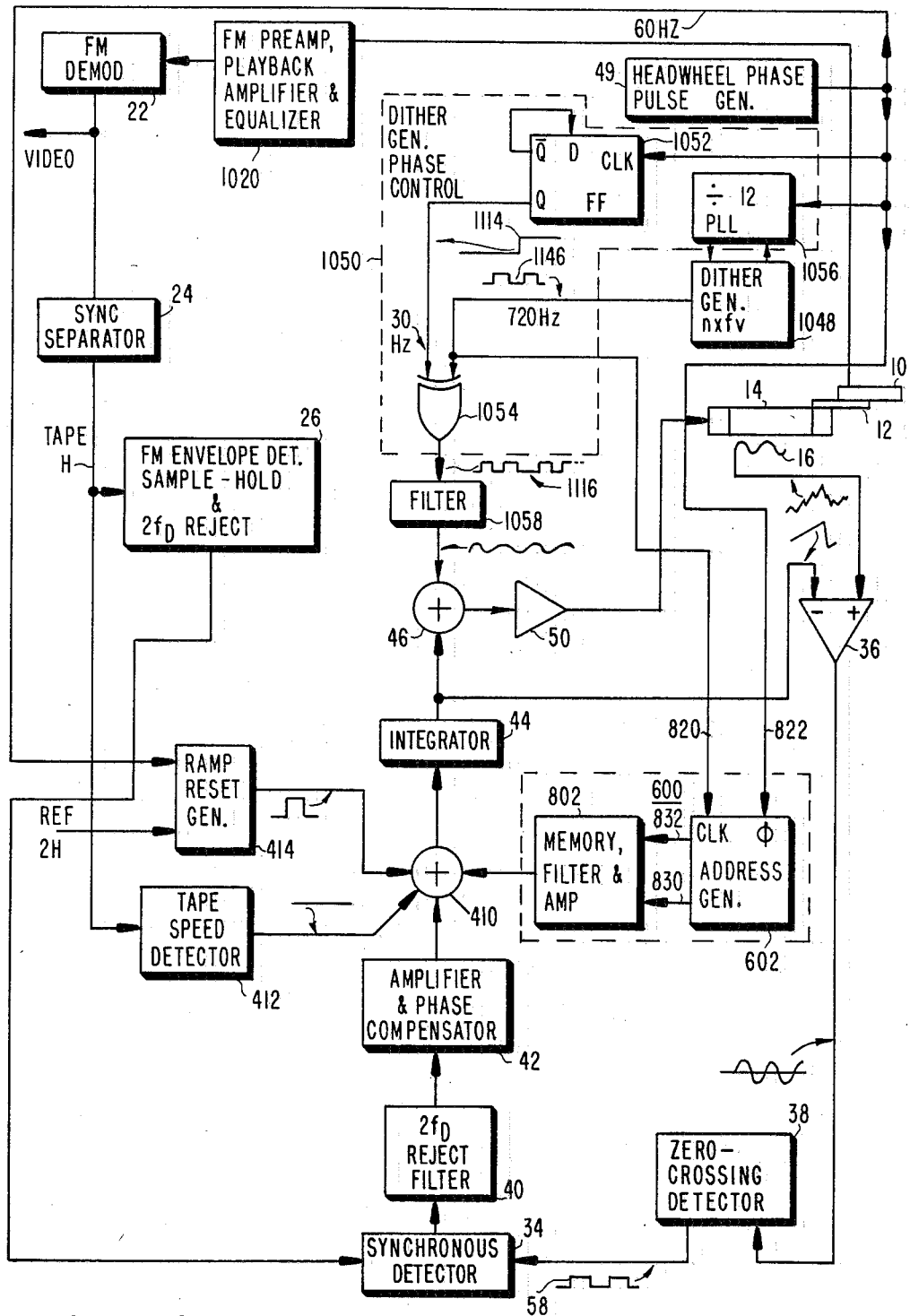
FIG. 10 is a block diagram of an embodiment of the invention similar to FIG. 8, including a dither phase change switch.
Figure 11:
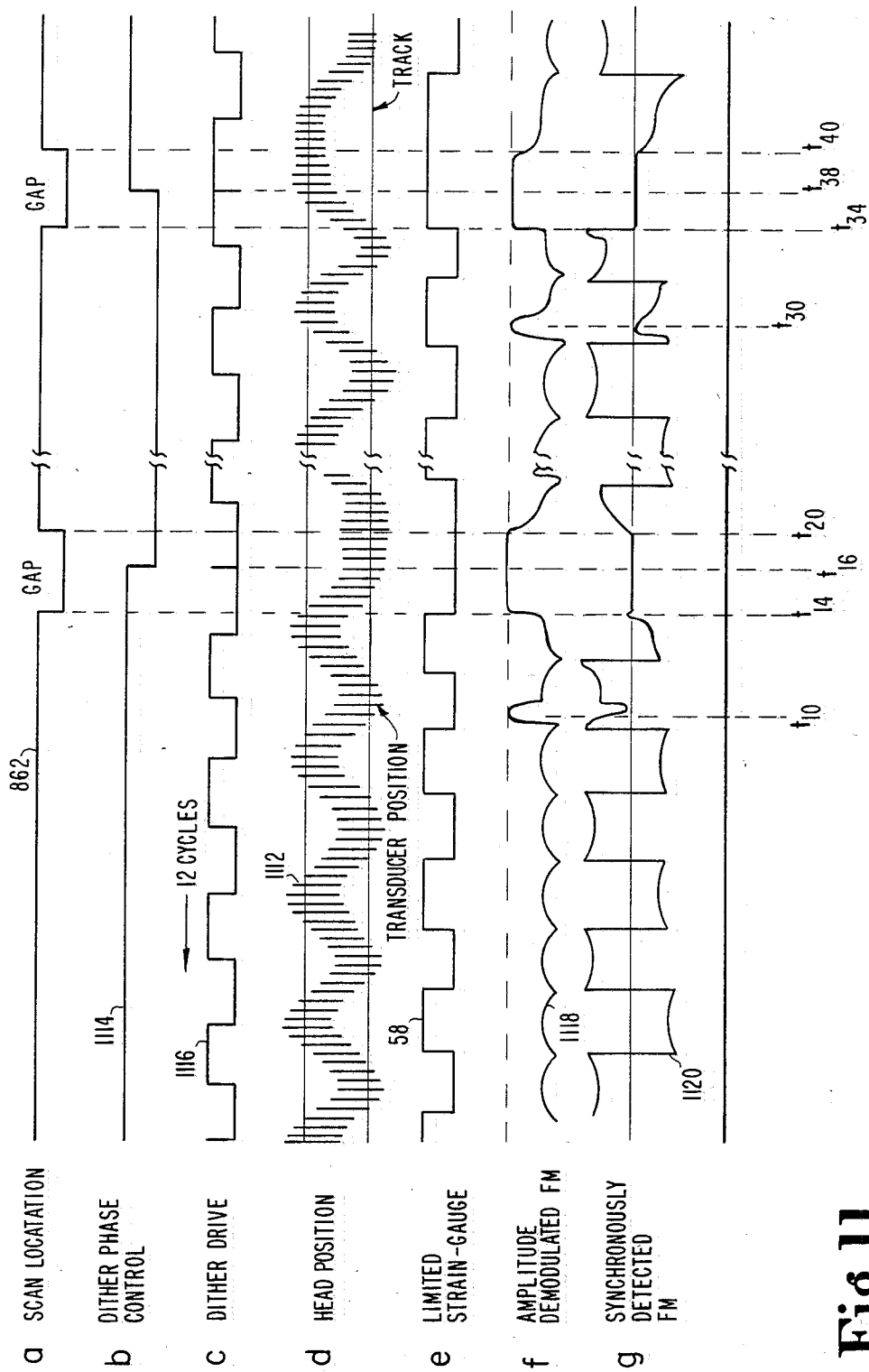
FIGS. 11a–11g show timing diagrams illustrating the operation of the arrangement of FIG. 10.

In FIG. 10, the headwheel phase pulse is applied to a phase-lock loop (PLL) 1056 associated with dither generator 1048. As is known, PLL 1056 includes a divide-by-12 counter which counts down the output of square-wave generator 1048 for comparison with the 60 Hz headwheel pulse, so as to produce a square wave 1146 of twelve times 60 Hz, or 720 Hz. As mentioned, this produces 12 dither cycles over a field interval. Square-wave 1146 is applied to a first input of EXOR gate 1054. The headwheel phase pulse is also applied to a divide-by-two counter in the form of a FF 1052 which produces a 30 Hz square wave illustrated as 1114 in synchronism with the headhwheel phase pulse. Square wave 1114 is applied to the second input of EXOR 1054, and as known causes the phase of square-wave 1146 to be periodically inverted to form phase-switched dither drive 1116, as illustrated in FIG. 11. The periodically-inverted square wave from EXOR 1054 is applied to a bandpass filter 1058 which passes the 720 Hz sine-wave fundamental to be summed in adder 46 with the feedback-loop signal for application to bimorph amplifier 50. Bimorph 14 responds by deflecting the drive transducer head 10 transversely as illustrated in FIG. 11d. The amplitude-limited strain-gauge signal 58 illustrated in FIG. 11e is synchronous with the head deflection. As previously described, the strain-gauge signal is used to demodulate the detected FM signal 1118 to produce synchronously detected signal 1120. FIGS. 8d and 8e show the complete 12 cycles of dither in each field, only portions of which are shown in FIG. 11. At time $t_{10}$ and $t_{30}$, amplitude-demodulated FM signal 1118 exhibits a systematic decrease unrelated to the head deviation, which in the absence of the invention would be integrated and memorized by memory 600 and because of the high gain of the memory loop would tend to drive the head off the track. In accordance with the invention, dither phase control signal 1114 makes a transition at time $t_{16}$, which is in the interval in which the head is crossing the gap and therefore does not transduce signals. The transition reverses the phase of dither drive signal 1116 at times $t_{16}$ and $t_{38}$, thereby reversing the phase of the head position relative to the track in the interval $t_{16}$–$t_{38}$ relative to times before $t_{16}$. Consequently, the strain-gauge signal 58 by which signal 1118 is demodulated also reverses phase, so that the systematic reduction in FM amplitude at times $t_{10}$, $t_{30}$ . . . is demodulated on alternate half-cycles of the strain-gauqe signal and therefore takes on opposite polarities during alternate fields, while signal values related to head deviation do not change polarity. Memory 600 is addressed by the non-phase-reversed dither clock signal, and therefore the same capacitor integrates the signal at times $t_{10}$ and $t_{38}$. The opposite-polarity signals attributable to systematic causes other than head deviation therefore tend to cancel, eliminating their perturbing effect.

Figure 12:
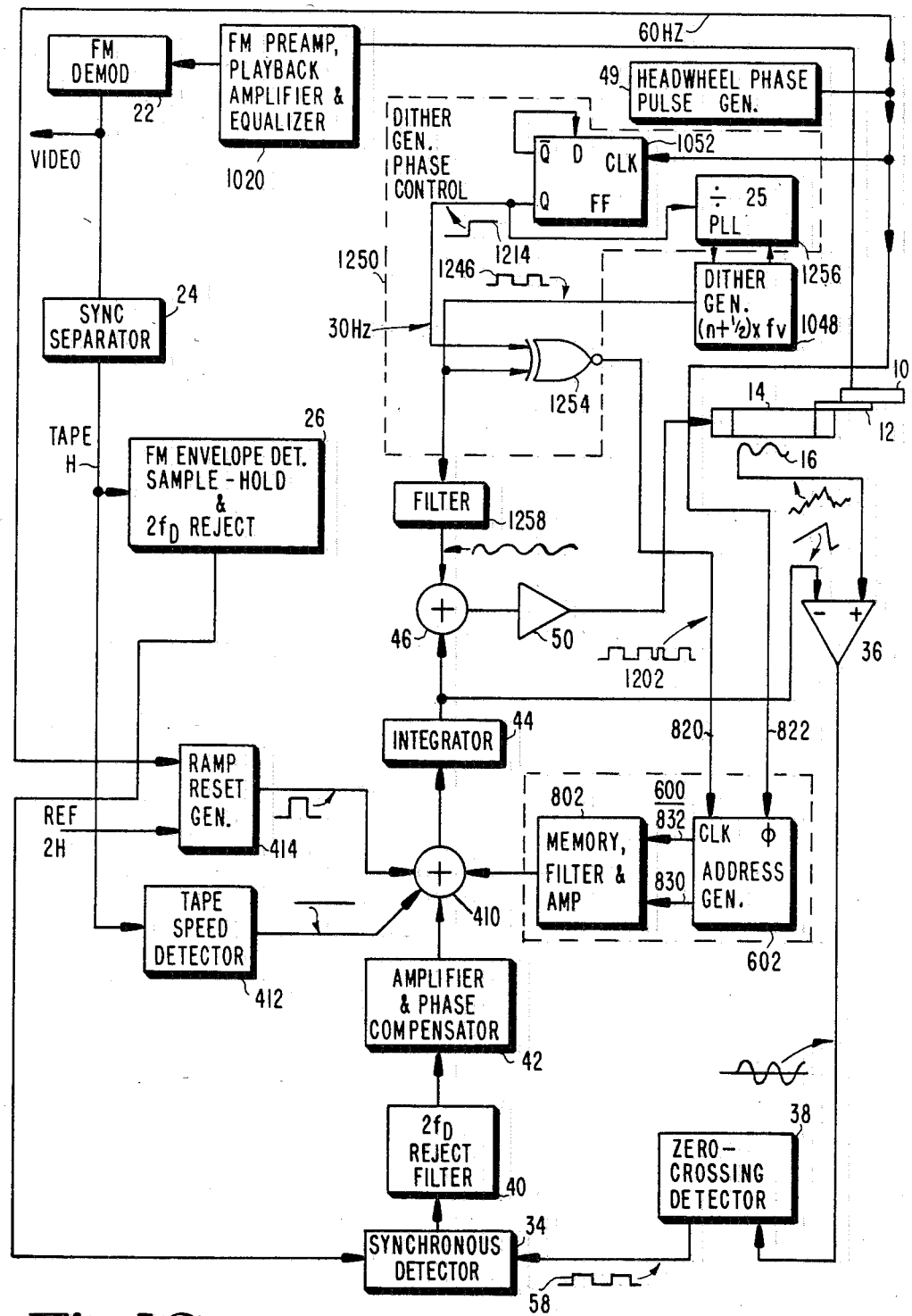
FIG. 12 is a block diagram of an embodiment of the invention similar to FIG. 8 including progressive dither phase change.

In the arrangement of FIG. 12, dither generator 1048 is controlled by a phase control 1250, which rather than switching phase each field instead produces progressive phase change of 180 degrees per field. Control 1250 generates a 30 Hz square-wave by means of FF 1052 as in the arrangement of FIG. 10. PLL 1256 divides the dither generator signal 1246 frequency by 25 and compares it with the 30 Hz signal to produce a dither signal of 750 Hz illustrated as 1246 in FIG. 13, which is filtered by 750 Hz filter 1258 to produce a 750 Hz sinusoidal dither drive signal. The sinusoidal dither drive signal produces a sinusoidal excursion of the transducer head gap across the track, as illustrated in FIG. 13C. The 750 Hz signal drives the transducer and the associated strain gauge with a phase which progresses by 180 degrees per field. Thus, rather than 12 complete physical dither cycles per field, there are $12\frac{1}{2}$ cycles; consequently at any point along a position of the track corresponding in time to a particular portion of a television field the phase of the physical deviation is 180 degrees relative to the previous and subsequent scans, as illustrated in FIGS. 13b and 13b'.

In FIG. 13, a time of slightly more than two field intervals is represented, broken into upper and lower portions of the FIGURE. The upper portion including FIGS. 13a–h subtends slightly more than one field interval, while lower portion 13a'–h' represents slightly more than the next following field. The alignment of FIGS. 13a–h relative to 13a'–h' is such that corresponding portions of the field are in vertical alignment. The time $t_{60}$ at which FIGS. 13a'–h' begin is at the left edge of the FIGURE, and time $t_{60}$ is also marked on the upper portion of the FIGURE for ease in understanding. It should be noted that the time overlap provided to reduce the need to switch between upper and lower portions of the FIGURE causes the same portion of the waveforms to appear at different locations in the drawing. Thus, time $t_{0'}$ appears near the end (on the right) of the upper portion of FIG. 13 and also near the left end of the lower portion.

The amplitude-demodulated FM signal 1340 takes on a zero value in each gap interval $t_0$–$t_6$; $t_0'$–$t_6'$. . . Amplitude-demodulated FM signal 1340 also illustrates an anomalous reduction in amplitude near times $t_{16}$, $t_{16}'$. . . , as well as a reduction in amplitude between times $t_{20}$–$t_{40}$; $t_{30'}$–$t_{40'}$;. . . which results from a tracking error which repeats from track to track. As illustrated in an exaggerated manner in FIGS. 13C, 13C', the scan deviates from the track in an upward direction. The duty cycle of the limited strain-gauge signal does no change in the region of the deviation, as illustrated, also in exaggerated form, in FIGS. 13d, 13d'. It should be noted that during a deviation from correct tracking, the detected signal can decrease, but can never increase beyond the maximum which occurs during correct tracking, because the maximum signal occurs when the head gap is exactly aligned with the track.

The synchronously detected demodulated FM signal is illustrated in FIGS. 13f, 13f'. It can be seen that the systematic reduction in detected FM signal 1340 near time $t_{16}$ is demodulated by a positive-going half-cycle 1360 of the strain-gauge signal to give a non-reversed polarity reduction in the amplitude of synchronously detected signal 1302 in the interval $t_{15}$–$t_{17}$, while the reduction in amplitude in the interval $t'_5$-15-$t'_{17}$ is demodulated by a negative-going half-cycle 1362 of the limited strain-gauge signal, thereby resulting in a reversed-polarity portion of synchronously detected signal 1302 in interval $t'_{15}$-$t'_{17}$. This reversal of polarity results from the reversed phases of the limited strain gauge clock used for synchronous demodulation in the sequential fields, and this in turn results from the reversal of the physical dither from field to field by the extra half-cycle of the dither signal in each field. This reversal of polarity will cancel from field to field if stored in the same capacitor in memory 600.

Since the amplitude-demodulated FM 1340 in FIG. 13e is demodulated by means of a strain-gauge signal related to the actual physical deviation, the demodulation takes place synchronously without any phase inversion. The physical inversion or phase-shift of the scanning of the track by the head would in the absence of any change to the memory result in alternating the polarity of the error signal being applied to any particular capacitor of the memory on successive fields, resulting in cancellation of the desired signal. This is avoided by alternating the phase of the clock drive to the address generator 602 which controls writing of the memory capacitors. The dither clock phase control signal 1214 produced by FF 1052 is illustrated in FIGS. 13g, g' and is applied to EXOR gate 1254 having an inverted output to produce memory write clock signal 1202, illustrated in FIGS. 13h, h'. This alternation in memory clock phase effectively maintains the location of the track being memorized by any particular capacitor in spite of the one-half cycle physical dither change from field to field, so that the capacitor is charged by a signal of the same polarity from field to field for the same sense of mistracking (i.e., to the right or to the left). Systematic reduction (or, rarely, increase) in detected amplitude is made to represent physical deviations of opposite directions during alternate scans. The synchronously detected signal is illustrated as 1302 in FIG. 13f,f'. The dither phase control clock illustrated as 1214 causes reversal of the phase of the dither-rate clock signal 1202 applied to memory address 602, with each reversal taking place near the gap region, where the transducer produces no signal and during which the memory capacitor for the start of the following scan is read repeatedly. The positive-going transitions of memory write clock 1202 of FIG. 13h causes clocking of address generator 602, causing sequential addressing of capacitors for the duration of the complete clock interval. The memory control 602 is reset by a vertical pulse related to the once-around signal of FIG. 13a. The capacitors being addressed for writing as a result of a particular clock pulse are numbered in FIG. 13h,h'. It will be understood that FIG. 13 is simplified in that it does not show the delays resulting from system time constants, which are explained in conjunction with FIG. 8. It will be noted that the times after time $t_{16}$ and $t'_{16}$ during which anomalous systematic signals are generated occur during the addressing of capacitor 5, so the positive and negative-going components cancel, leaving only that portion of the signal arising from the physical deviation of the transducer head for memory control of the feedback loop. Thus, the anomalous signals cannot affect the tracking and the loop gain may be increased without the possibility of mistracking due to systematic anomalies.

The effect of the phase shift on deviation-dependent reductions in signal amplitude may be illustrated by reference to FIG. 13 in the intervals $t_{30}$-$t_{40}$; $t'_{30}$-$t'_{40}$. In the interval $t_{30}$-$t_{40}$, the scanning of the track deviates upwward, causing a great reduction in detected signal amplitude for about half a cycle of physical dither deviation, as illustrated by detected signal 1340. this reduced signal is synchronously detected by the positive-going half-cycles of the limited strain-gauge signal, and the reduced signal is stored in capacitors 7 and 8. The same direction of mistracking in the next following field also causes a reduction in the amplitude of detected signal 1340, this time in interval $t'_{30}$-$t_{40}$. Because the strain-gauge signal 1362 phase follows the phase of the physical deviation, the synchronous demodulation of the reduced-amplitude portions is also by the positive-going approximate half-cycles of strain-gauge signal 1362, with the result that the synchronously detected signal is again a low-value negative-polarity signal, as in the case of the interval $t_{30}$-$t'_{40}$. This same-polarity signal is stored in capacitors 7 and 8, because the reversal of memory address clock phase maintains the capacitors in association with the same relative position on the track. The desired physical-deviation-dependent signals therefore do not cancel, but are reinforced to form a loop control signal. In effect, the alternation of the phase of the dither from field to field allows reductions in amplitude resulting from anomalous causes to be separated from reductions in amplitude which arise from physical dither-related effects.

Other embodiments of the invention will be apparent to those skilled in the art. For example, other storage elements, such as CCD delay lines, may be used as memories for storing the error signal. Ancillary circuits such as excessive-deflection protectors may be included within the scope of the invention. Piezoelectric bending indicators may be used rather than strain gauges. The tape speed detector, if used, may be any of the known conventiona speed detectors, including a tachometer coupled to a tape drive capstan. The size of the various capacitors C of the analog filter of FIG. 6 may differ one from the other, if desired, in order to tailor the loop gain, and the decay time constant may be adjusted to suit the system constants. Digital RAMs (Random-access memories) may be used instead of storage capacitors for storing either the error or jump signal, or both. A further memory termed a jump memory may be operated to store the value of the particular bimorph drive voltage required to reset the bimorph by the number of tracks required by ramp reset geerator 414.

The invention may be applied to automatic scan tracking systems for optical discs, in which dither of the light beam by a reflective mirror may be changed in phase at either end of the sinusoidal rocking of the mirror.

While the memory clock as illustrated in the embodiments is derived from the dither generator, this is a mere convenience. The memory clock merely needs to be locked to the headwheel once-around and there is no advantage to clocking at a rate higher than the dither rate, as the dither establishes the loop frequency response.

What is claimed is:

1. An automatic scan tracking arrangement for maintianing a playback transducer aligned with a recorded

UNITED STATES PATENT AND TRADEMARK OFFICE
CERTIFICATE OF CORRECTION

PATENT NO. : 4,595,960

DATED : June 17, 1986

INVENTOR(S) : KAARLO JUHANI HAMALAINEN ET AL

It is certified that error appears in the above-identified patent and that said Letters Patent is hereby corrected as shown below:

Column 8, line 40 that portion reading "o0f" should read --of--. Column 8, line 42 that portion reading "multiles" should read --multiples--. Column 9, line 18 that portion reading "Figs. 8c" should read --Figs. 8c-k--. Column 12, line 58 that portion reading "illuslrate" should read --illustrate--. Column 14, line 55 that portion reading "$t_{20}-t_{40}$" should read -- $t_{30}-t_{40}$ --. Column 14, line 59 that portion reading "no" should read --not--. Column 14, line 69 that portion reading "FIGS. 13f,13f" should read --FIGS. 13f, 13f'--. Column 15, line 45 that portion reading "13f,f" should read --13f,f'--. Column 16, line 10 that portion reading "this" should read --This--. Column 16, line 16 that portion reading "$t'_{30}-t_{40}$" should read --$t'_{30}-t'_{40}$--. Column 16, line 23 reading "$t_{30}-t'_{40}$" should read --$t_{30}-t_{40}$--. Column 17, line 7 that portion reading "nomincally" should read --nominally--. Column 17, line 10 that portion reading "recoreded" should read --recorded--. Column 17, line 15 after "transducer" and before "to" insert --relative--. Column 17, line 15 that portion reading "recoreded" should read --recorded--. Column 17, line 67 that portion reading "store" should read --stored--. Column 18, line 5 that portion reading "clobking" should read --clocking--.

Signed and Sealed this

Third Day of February, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,595,960

DATED : June 17, 1986

INVENTOR(S) : KAARLO JUHANI HAMALAINEN ET AL

It is certified that error appears in the above-identified patent and that said Letters Patent is hereby corrected as shown below:

Column 8, line 40 that portion reading "oOf" should read --of--. Column 8, line 42 that portion reading "multiles" should read --multiples--. Column 9, line 18 that portion reading "Figs. 8c" should read --Figs. 8c-k--. Column 12, line 58 that portion reading "illuslrate" should read --illustrate--. Column 14, line 55 that portion reading "$t_{20}-t_{40}$" should read -- $t_{30}-t_{40}$ --. Column 14, line 59 that portion reading "no" should read --not--. Column 14, line 69 that portion reading "FIGS. 13f,13f" should read --FIGS. 13f, 13f'--. Column 15, line 45 that portion reading "13f,f" should read --13f,f'--. Column 16, line 10 that portion reading "this" should read --This--. Column 16, line 16 that portion reading "$t'_{30}-t_{40}$" should read --$t'_{30}-t'_{40}$--. Column 16, line 23 reading "$t_{30}-t'_{40}$" should read --$t_{30}-t_{40}$--. Column 17, line 7 that portion reading "nomincally" should read --nominally--. Column 17, line 10 that portion reading "recoreded" should read --recorded--. Column 17, line 15 after "transducer" and before "to" insert --relative--. Column 17, line 15 that portion reading "recoreded" should read --recorded--. Column 17, line 67 that portion reading "store" should read --stored--. Column 18, line 5 that portion reading "clobking" should read --clocking--.

Signed and Sealed this

Third Day of February, 1987

Attest:

DONALD J. QUIGG

Attesting Officer

Commissioner of Patents and Trademarks